US010829406B2

(12) United States Patent
Suzuki

(10) Patent No.: US 10,829,406 B2
(45) Date of Patent: Nov. 10, 2020

(54) GLASS MATERIAL AND METHOD FOR MANUFACTURING SAME

(71) Applicant: NIPPON ELECTRIC GLASS CO., LTD., Otsu (JP)

(72) Inventor: Futoshi Suzuki, Otsu (JP)

(73) Assignee: NIPPON ELECTRIC GLASS CO., LTD., Shiga (JP)

(*) Notice: Subject to any disclaimer, the term of this patent is extended or adjusted under 35 U.S.C. 154(b) by 0 days.

(21) Appl. No.: 16/331,563

(22) PCT Filed: Aug. 18, 2017

(86) PCT No.: PCT/JP2017/029676
§ 371 (c)(1),
(2) Date: Mar. 8, 2019

(87) PCT Pub. No.: WO2018/066239
PCT Pub. Date: Apr. 12, 2018

(65) Prior Publication Data
US 2019/0210912 A1 Jul. 11, 2019

(30) Foreign Application Priority Data

Oct. 7, 2016 (JP) ................. 2016-198993
Apr. 14, 2017 (JP) ................. 2017-080501

(51) Int. Cl.
C03C 3/19 (2006.01)
C03C 3/15 (2006.01)
C03C 4/00 (2006.01)
C03C 3/068 (2006.01)
C03C 3/17 (2006.01)
C03C 3/095 (2006.01)
C03B 19/00 (2006.01)

(52) U.S. Cl.
CPC ............ C03C 3/19 (2013.01); C03C 3/068 (2013.01); C03C 3/095 (2013.01); C03C 3/15 (2013.01); C03C 3/17 (2013.01); C03C 4/0085 (2013.01); C03B 19/00 (2013.01); C03C 2203/10 (2013.01)

(58) Field of Classification Search
CPC .... C03C 3/19; C03C 3/15; C03C 3/17; C03C 3/068; C03C 3/23; C03C 3/247; C03C 3/095; C03C 2203/10; C03C 4/0085; C03B 19/00; G02F 1/09
See application file for complete search history.

(56) References Cited

U.S. PATENT DOCUMENTS

| | | | |
|---|---|---|---|
| 3,971,723 A | 7/1976 | Tajima et al. | |
| 5,378,662 A * | 1/1995 | Tsuyuki | C03C 3/068 501/17 |
| 5,747,397 A * | 5/1998 | McPherson | C03C 3/068 501/51 |
| 6,482,758 B1 | 11/2002 | Weber et al. | |
| 2010/0096565 A1 | 4/2010 | Mukaide et al. | |
| 2011/0129179 A1* | 6/2011 | Jiang | C03C 13/00 385/11 |
| 2011/0261454 A1* | 10/2011 | Jiang | C03C 13/046 359/484.03 |
| 2012/0152730 A1 | 6/2012 | Mukaide et al. | |
| 2013/0329280 A1* | 12/2013 | Jiang | C03C 13/046 359/341.3 |

FOREIGN PATENT DOCUMENTS

| | | |
|---|---|---|
| JP | 51-046524 B2 | 12/1976 |
| JP | 52-032881 B2 | 8/1977 |
| JP | 55-042942 B2 | 11/1980 |
| JP | 04-170338 A | 6/1992 |
| JP | 2008-150276 A | 7/2008 |
| JP | 2016-121264 A | 7/2016 |

OTHER PUBLICATIONS

Terashima et al., "Structure and Nonlinear Optical Properties of Lanthanide Borate Glasses", Journal of the American Ceramic Society, vol. 80, No. 11, 1997, pp. 2903-2909. (Year: 1997).*
Official Communication issued in International Patent Application No. PCT/JP2017/029676, dated Oct. 10, 2017.
Terashima et al., "Structure and Nonlinear Optical Properties of Lanthanide Borate Glasses", Journal of the American Ceramic Society, vol. 80, No. 11, 1997, pp. 2903-2909.

* cited by examiner

Primary Examiner — Elizabeth A. Bolden
(74) Attorney, Agent, or Firm — Keating and Bennett, LLP

(57) ABSTRACT

Provided is a glass material that can satisfy both a high Faraday effect and a high light transmittance in a short wavelength range. A glass material contains, in % by mole, 30 to 50% $Pr_2O_3$ and 0.1 to 70% $B_2O_3+P_2O_5$.

5 Claims, 1 Drawing Sheet

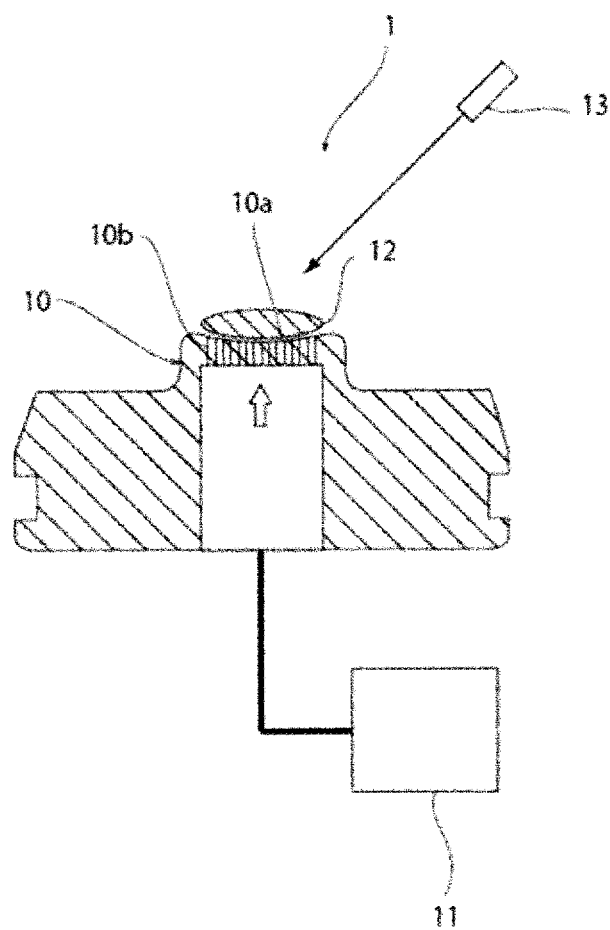

GLASS MATERIAL AND METHOD FOR MANUFACTURING SAME

TECHNICAL FIELD

The present invention relates to a glass material suitable as a material for a magneto-optical element making up part of a magnetic device, such as an optical isolator, an optical circulator or a magnetic sensor, for a magnetic glass lens for use in a digital camera or the like, and for a glass sheet for use in a bandpass filter, and also relates to a method for manufacturing the same.

BACKGROUND ART

A glass material containing terbium oxide which is a paramagnetic compound is known to exhibit the Faraday effect which is one of magneto-optical effects. The Faraday effect is an effect of rotating the polarization plane of linearly polarized light passing through a material placed in a magnetic field. This effect is utilized in optical isolators, magnetic field sensors, and so on.

The optical rotation θ (angle of rotation of the polarization plane) due to the Faraday effect is expressed by the following formula where the intensity of a magnetic field is represented by H and the length of a substance through which polarized light passes is represented by L. In the formula, V represents a constant dependent on the type of the substance and is referred to as a Verdet constant. The Verdet constant takes positive values for diamagnetic substances and takes negative values for paramagnetic substances. The larger the absolute value of the Verdet constant, the larger the absolute value of the optical rotation, resulting in exhibition of greater Faraday effect.

$$\theta = VHL$$

Conventionally known glass materials exhibiting the Faraday effect include $SiO_2$—$B_2O_3$—$Al_2O_3$—$Tb_2O_3$-based glass materials (see Patent Literature 1), $P_2O_5$—$B_2O_3$—$Tb_2O_3$-based glass materials (see Patent Literature 2), and $P_2O_5$—$TbF_3$—$RF_2$— (where R represents an alkaline earth metal) based glass materials (see Patent Literature 3).

CITATION LIST

Patent Literature

[PTL 1]
Examined Japanese Patent Application Publication No. S51-46524
[PTL 2]
Examined Japanese Patent Application Publication No. S52-32881
[PTL 3]
Examined Japanese Patent Application Publication No. S55-42942

SUMMARY OF INVENTION

Technical Problem

The above glass materials exhibit high transmittances from a visible range to an infrared range (for example, from 420 to 1500 nm), but exhibit light absorption due to terbium element itself in a short wavelength range (for example, below 420 nm). Therefore, the above glass materials have a problem that the light transmittance decreases in a short wavelength range and, thus, the resultant magneto-optical devices have poor light extraction efficiency.

In view of the foregoing, an object of the present invention is to provide a glass material that can satisfy both a high Faraday effect and a high light transmittance in a short wavelength range.

Solution to Problem

The inventor conducted intensive studies and, as a result, found that the above problem can be solved by a glass material having a specific composition.

Specifically, a glass material according to the present invention contains, in % by mole, 30 to 50% $Pr_2O_3$ and 0.1 to 70% $B_2O_3+P_2O_5$. As used herein, "$B_2O_3+P_2O_5$" means the total content of $B_2O_3$ and $P_2O_5$.

Since the glass material according to the present invention contains $Pr_2O_3$ in large amounts as described above, it has a large absolute value of the Verdet constant and therefore exhibits a large Faraday effect. Furthermore, $Pr_2O_3$ basically does not exhibit light absorption in a wavelength range of 420 nm and below (for example, 250 to 420 nm) and, therefore, the glass material exhibits a high transmittance in this wavelength range.

If the ultraviolet absorption edge of a glass is near 400 nm, ultraviolet absorption of the glass itself occurs even without ultraviolet absorption of $Pr_2O_3$, which incurs a reduction in transmittance at 420 nm and below. The inventor found that if a glass material contains at least one of $B_2O_3$ and $P_2O_5$ as an essential component, the ultraviolet absorption edge of the glass shifts toward the short wavelength side, and thus has proposed the present invention. In addition, $B_2O_3$ and $P_2O_5$ are glass network components and, therefore, have a feature of easily vitrifying even if the glass material contains $Pr_2O_3$ in large amounts. Thus, the glass material becomes less likely to crystallize even if it is formed to have a large diameter, so that the productivity can be increased.

The glass material according to the present invention preferably further contains, in % by mole, 0 to 50% $Al_2O_3$. Thus, vitrification becomes easier.

In the glass material according to the present invention, a shortest wavelength at which a light transmittance reaches 60% at a thickness of 1 mm is preferably 350 nm or less. Thus, the light extraction efficiency of a magneto-optical device in a short wavelength range can be improved.

The glass material according to the present invention can be used as a magneto-optical element. For example, the glass material according to the present invention can be used as a Faraday rotator which is a type of magneto-optical element. With the use for the above application, the user can receive the full benefit of the effect of the present invention.

A method for manufacturing a glass material according to the present invention is a method for manufacturing the above-described glass material and includes the step of heating a block of glass raw material to melting while holding the block of glass raw material levitated in air, thus obtaining a molten glass, and then cooling the molten glass.

Generally, a glass material is produced by melting a raw material in a melting container, such as a crucible, and cooling it (melting method). However, the glass material according to the present invention has, as described above, a composition containing a large amount of $Pr_2O_3$ basically not forming a glass network and is therefore a less vitrifiable material. For this reason, the use of a normal melting method would result in progression of crystallization of the material originating on the contact interface with the melting container.

Even if the glass material has a less vitrifiable composition, vitrification thereof can be achieved by eliminating its contact at the interface with the melting container. As such a technique, a containerless levitation technique is known in which a raw material is melted and cooled while held levitated. With the use of this technique, the molten glass is substantially kept out of contact with the melting container, so that crystallization originating on the interface with the melting container can be prevented and the glass material can be thus vitrified.

Advantageous Effects of Invention

The glass material according to the present invention is possible to provide a glass material that can satisfy both a high Faraday effect and a high light transmittance in a short wavelength range and is suitable as an Faraday rotator of a magneto-optical device in a short wavelength range.

BRIEF DESCRIPTION OF DRAWINGS

FIG. 1 is a schematic cross-sectional view showing one embodiment of an apparatus for manufacturing a glass material according to the present invention.

DESCRIPTION OF EMBODIMENTS

A glass material according to the present invention contains, in % by mole, 30 to 50% $Pr_2O_3$ and 0.1 to 70% $B_2O_3+P_2O_5$. The reasons why the range of the glass composition is defined as above will be described below. In the following description of the contents of components, "%" refers to "% by mole" unless otherwise specified.

$Pr_2O_3$ is a component for increasing the absolute value of the Verdet constant to increase the Faraday effect. The content of $Pr_2O_3$ is 30 to 50%, preferably 30 to 49%, more preferably 31 to 48%, and particularly preferably 32 to 47%. If the content of $Pr_2O_3$ is too small, the absolute value of the Verdet constant becomes small, so that a sufficient Faraday effect is less likely to be achieved. On the other hand, if the content of $Pr_2O_3$ is too large, the ultraviolet absorption edge of the glass is likely to shift toward the long wavelength side. Furthermore, vitrification tends to become difficult.

Note that the content of $Pr_2O_3$ in the present invention is represented by calculationally converting all elements of Pr present in the glass to its trivalent oxides.

The magnetic moment from which the Verdet constant is derived is greater in $Pr^{3+}$ than in $Pr^{4+}$. A larger percentage of $Pr^{3+}$ in the glass material is more preferable because the Faraday effect becomes greater. Specifically, the percentage of $Pr^{3+}$ in the total content of Pr is, in % by mole, preferably 50% or more, more preferably 60% or more, still more preferably 70% or more, yet more preferably 80% or more, and particularly preferably 90% or more.

$B_2O_3$ and $P_2O_5$ are components for forming a glass network and widening the vitrification range. Furthermore, incorporation of these components into the glass material enables the ultraviolet absorption edge to shift toward the short wavelength side. However, these components do not contribute to increasing the Verdet constant. Therefore, if the content of these components is too large, a sufficient Faraday effect is less likely to be achieved. Hence, in total amount, the content of $B_2O_3$ and $P_2O_5$ is 0.1 to 70%, preferably 0.5 to 69%, more preferably 1 to 68%, even more preferably 2 to 67%, still more preferably 3 to 66%, and particularly preferably 4 to 65%.

The respective preferred contents of $B_2O_3$ and $P_2O_5$ are as follows.

The content of $B_2O_3$ is preferably 0 to 70% (exclusive of 70%), more preferably 0.1 to 69%, even more preferably 1 to 68%, still more preferably 2 to 67%, yet still more preferably 3 to 66%, and particularly preferably 4 to 65%.

The content of $P_2O_5$ is preferably 0 to 70%, more preferably 0.1 to 60%, even more preferably 1 to 55%, still more preferably 2 to 50%, even still more preferably 3 to 48%, yet still more preferably 4 to 47%, and particularly preferably 5 to 46%.

The glass material according to the present invention may contain, in addition to the above components, the following various types of components.

$Al_2O_3$ is a component for forming a glass network as an intermediate oxide and widening the vitrification range. However, $Al_2O_3$ does not contribute to increasing the Verdet constant. Therefore, if its content is too large, a sufficient Faraday effect is less likely to be achieved. Hence, the content of $Al_2O_3$ is preferably 0 to 50%, more preferably 0.1 to 40%, still more preferably 1 to 30%, yet more preferably 1 to 20%, and particularly preferably 1 to 10%.

$SiO_2$ is a component that contributes to the formation of glass and widens the vitrification range. However, if the content of $SiO_2$ is large, the ultraviolet absorption edge of the glass is likely to shift toward the long wavelength side. Therefore, the content of $SiO_2$ is preferably 0 to 40%, more preferably 0 to 35%, still more preferably 0 to 30%, yet still more preferably 0.1 to 25%, and particularly preferably 1 to 20%.

$La_2O_3$, $Gd_2O_3$, $Yb_2O_3$, and $Y_2O_3$ have the effect of increasing the stability of vitrification, but an excessively large content thereof contrariwise makes vitrification difficult. Furthermore, these components provide cause of a decrease in light transmittance. Therefore, the content of each of $La_2O_3$, $Gd_2O_3$, $Yb_2O_3$, and $Y_2O_3$ is preferably 10% or less and particularly preferably 5% or less.

$Tb_2O_3$, $Dy_2O_3$, $Eu_2O_3$, and $Ce_2O_3$ contribute to increasing the Verdet constant, but provide cause of a decrease in light transmittance. Therefore, the content of each of $Tb_2O_3$, $Dy_2O_3$, $Eu_2O_3$, and $Ce_2O_3$ is preferably 10% or less, more preferably 5% or less, and particularly preferably 1% or less. Note that the contents of $Tb_2O_3$, $Dy_2O_3$, $Eu_2O_3$, and $Ce_2O_3$ are represented by calculationally converting all elements of each of Tb, Dy, Eu, and Ce present in the glass to its trivalent oxides.

MgO, CaO, SrO, and BaO have the effect of increasing the stability of vitrification and chemical durability. However, these components do not contribute to increasing the Verdet constant. Therefore, if the content of them is too large, a sufficient Faraday effect is less likely to be achieved. Hence, the content of each of these components is preferably 0 to 10% and particularly preferably 0 to 5%.

$Ga_2O_3$ has the effect of increasing the glass formation ability and widening the vitrification range. However, an excessively large content thereof makes the resultant glass likely to be devitrified. Furthermore, $Ga_2O_3$ does not contribute to increasing the Verdet constant. Therefore, if its content is too large, a sufficient Faraday effect is less likely to be achieved. Hence, the content of $Ga_2O_3$ is preferably 0 to 6% and particularly preferably 0 to 5%.

Fluorine has the effect of increasing the glass formation ability and widening the vitrification range. However, if its content is too large, fluorine volatilizes during melting, which may cause a composition variation or may have an influence on the stability of vitrification. Therefore, the content of fluorine (in terms of $F_2$) is preferably 0 to 10%, more preferably 0 to 7%, and particularly preferably 0 to 5%.

$Sb_2O_3$ may be added as a reductant. However, in order to avoid coloration or in consideration of environmental burden, the content of $Sb_2O_3$ is preferably 0.1% or less.

In using the glass material according to the present invention particularly as a magneto-optical element, such as an optical isolator, an optical circulator or a magnetic sensor, its ultraviolet absorption edge is preferably at a short wavelength. Therefore, the shortest wavelength at which its light transmittance reaches 60% at a thickness of 1 mm is preferably 350 nm or less, more preferably 345 nm or less, even more preferably 340 nm or less, still more preferably 330 nm or less, yet still more preferably 320 nm or less, and particularly preferably 300 nm or less. Note that the light transmittance here is the external light transmittance including reflection.

The glass material according to the present invention can be manufactured, for example, by a containerless levitation technique. FIG. 1 is a schematic cross-sectional view showing an example of an apparatus for manufacturing a glass material by a containerless levitation technique. Hereinafter, a description will be given of a method for manufacturing a glass material according to the present invention with reference to FIG. 1.

The apparatus 1 for manufacturing a glass material includes a forming die 10. The forming die 10 also serves as a melting container. The forming die 10 includes a forming surface 10a and a plurality of gas jet holes 10b opening on the forming surface 10a. The gas jet holes 10b are connected to a gas supply mechanism 11, such as a compressed gas cylinder. Gas is supplied from this gas supply mechanism 11 via the gas jet holes 10b to the forming surface 10a. No particular limitation is placed on the type of the gas and the gas may be, for example, air or oxygen or may be nitrogen gas, argon gas, helium gas, carbon monoxide gas, carbon dioxide gas or hydrogen-containing reducing gas.

In manufacturing a glass material using the manufacturing apparatus 1, first, a block 12 of glass raw material is placed on the forming surface 10a. Examples of the block 12 of glass raw material include a body obtained by forming raw material powders into a single piece by press forming or other processes, a sintered body obtained by forming raw material powders into a single piece by press forming or other processes and then sintering the single piece, and an aggregate of crystals having the same composition as a desired glass composition.

Next, gas is jetted out through the gas jet holes 10b, thus levitating the block 12 of glass raw material above the forming surface 10a. In other words, the block 12 of glass raw material is held out of contact with the forming surface 10a. In this state, the block 12 of glass raw material is irradiated with laser light from a laser light applicator 13.

Thus, the block 12 of glass raw material is heated to melting to make it vitrifiable, thereby obtaining a molten glass. Thereafter, the molten glass is cooled, so that a glass material can be obtained. During the step of heating the block 12 of glass raw material to melting and the step of cooling the molten glass and in turn the glass material at least to below the softening point, at least the jetting of gas is preferably continued to restrain the contact of the block 12 of glass raw material, the molten glass, and finally the glass material with the forming surface 10a. The block 12 of glass raw material may be levitated above the forming surface 10a using a magnetic force generated by applying a magnetic field. Furthermore, the method for heating the block of glass raw material to melting may be radiation heating besides the method of irradiating it with laser light.

The glass material according to the present invention has a high magnetic susceptibility. Therefore, by molding it into a lens shape by press molding or other methods, it can be used as an autofocus lens for a digital camera, a camera-equipped cell-phone or the like. These types of cameras are provided with a drive unit for changing the focal distance of the camera, i.e., moving the autofocus lens to predetermined positions and the drive unit conventionally includes a lens holder for fixing the lens and a spring for moving the lens holder. However, with such a drive unit including a lens holder and a spring, a digital camera, a camera-equipped cell-phone or the like cannot be reduced in size. Unlike this, if the lens is formed of the glass material according to the present invention having a high magnetic susceptibility, the lens itself can move with the use of a magnet, which can eliminate the need for a lens holder and a spring and reduce the camera or so on in size.

Furthermore, in the glass material according to the present invention, the light transmittance in a wavelength range from 250 to 420 nm is higher than that in a wavelength range from 420 to 500 nm, the light transmittance in a wavelength range from 500 to 550 nm is higher than that in a wavelength range from 550 to 620 nm, and the light transmittance in a wavelength range from 620 to 950 nm is higher than that in a wavelength range from 950 to 1200 nm. As seen from this, the glass material according to the present invention has the property of absorbing light in a specific wavelength range. Therefore, by forming the glass material into the shape of a sheet by polishing or other methods, it can be used as a bandpass filter.

EXAMPLES

The present invention will be described below with reference to examples, but the present invention is not at all limited by the following examples.

Table 1 shows examples of the present invention and comparative examples.

TABLE 1

| | | Examples | | | | | Comparative Examples | |
|---|---|---|---|---|---|---|---|---|
| | | 1 | 2 | 3 | 4 | 5 | 1 | 2 |
| Glass Composition (% by mole) | $Pr_2O_3$ | 33 | 33 | 45 | 33 | 48 | 20 | 20 |
| | $SiO_2$ | | | | | 18 | | 80 |
| | $P_2O_5$ | 10 | 3 | 30 | | | | |
| | $B_2O_3$ | 47 | 64 | 20 | 17 | 24 | 50 | |
| | $Al_2O_3$ | 10 | | 5 | 50 | 10 | 30 | 20 |
| Verdet Constant @400 nm (min/Oe · cm) | | −0.88 | −1.1 | −1.21 | −0.74 | −1.87 | −0.48 | −0.62 |
| Shortest Wavelength At Which Light Transmittance Reached 60% (nm) | | 298 | 304 | 328 | 332 | 338 | 285 | 358 |

Each sample was prepared in the following manner. First, raw materials formulated to have a glass composition indicated in the table were press-formed and sintered at 800 to 1400° C. for 6 hours, thus producing a block of glass raw material.

Next, the block of glass raw material was coarsely ground into 0.05 to 1.5 g small pieces. Using the obtained small piece of the block of glass raw material, a glass material (with a diameter of approximately 1 to 10 mm) was produced by a containerless levitation technique using an apparatus conforming to FIG. 1. A 100 W $CO_2$ laser oscillator was used as a heat source. Furthermore, nitrogen gas was used as a gas for levitating the block of raw material in the air and supplied at a flow rate of 1 to 30 L/min.

The obtained glass material was measured in terms of the Verdet constant using a Kerr effect measuring system (manufactured by JASCO Corporation, Model K-250). Specifically, the obtained glass material was polished to have a thickness of about 1 mm and measured in terms of angle of Faraday rotation at a wavelength of 400 to 850 nm in a magnetic field of 15 kOe and the Verdet constant thereof at a wavelength of 400 nm was calculated. The wavelength sweep speed was 6 nm/min. The results are shown in Table 1.

Regarding the shortest wavelength at which the light transmittance reached 60%, the obtained glass material was polished to have a thickness of 1 mm and then measured with a spectro-photometer (UV-3100 manufactured by Shimadzu Corporation). The light transmittance is the external light transmittance including reflection.

As is obvious from Table 1, the glass materials of Examples 1 to 5 exhibited Verdet constants of −0.74 to −1.87 at a wavelength of 400 nm and the absolute values of the Verdet constants were large. Furthermore, the shortest wavelength at which the light transmittance reached 60% was as small as 298 to 338 nm and, therefore, the glass materials had excellent light transmittances in a short wavelength range. On the other hand, the Verdet constant of the glass material of Comparative Example 1 was −0.48 at a wavelength of 400 nm and the absolute value of the Verdet constant was small. The Verdet constant of the glass material of Comparative Example 2 was −0.62 at a wavelength of 400 nm and the absolute value of the Verdet constant was small. Furthermore, the shortest wavelength at which the light transmittance reached 60% was as large as 358 nm and, therefore, it had a poor light transmittances in a short wavelength range.

INDUSTRIAL APPLICABILITY

The glass material according to the present invention is suitable as a material for a magneto-optical element making up part of a magnetic device, such as an optical isolator, an optical circulator or a magnetic sensor, for a magnetic glass lens for use in a digital camera or the like, and for a glass sheet for use in a bandpass filter.

REFERENCE SIGNS LIST

1: apparatus for manufacturing a glass material
10: forming die
10a: forming surface
10b: gas jet hole
11: gas supply mechanism
12: block of glass raw material
13: laser light applicator

The invention claimed is:
1. A glass material containing, in % by mole, 31 to 50% $Pr_2O_3$ and 0.1 to 69% $B_2O_3+P_2O_5$, wherein
   a shortest wavelength at which a light transmittance reaches 60% at a thickness of 1 mm is 350 nm or less.
2. The glass material according to claim 1, further containing, in % by mole, 0 to 50% $Al_2O_3$.
3. A magneto-optical element comprising the glass material according to claim 1.
4. A Faraday rotator comprising the magneto-optical element according to claim 3.
5. A method for manufacturing the glass material according to claim 1, the method comprising the step of heating a block of glass raw material to melting while holding the block of glass raw material levitated in air, thus obtaining a molten glass, and then cooling the molten glass.

\* \* \* \* \*